(12) United States Patent
Juzswik

(10) Patent No.: US 6,968,176 B2
(45) Date of Patent: Nov. 22, 2005

(54) VEHICLE COMMUNICATION PATH TRACING SYSTEM FOR LONG RANGE REMOTE COMMUNICATION WITH A VEHICLE

(75) Inventor: David Leonard Juzswik, Commerce, MI (US)

(73) Assignee: TRW Inc., Lyndhurst, OH (US)

( * ) Notice: Subject to any disclaimer, the term of this patent is extended or adjusted under 35 U.S.C. 154(b) by 577 days.

(21) Appl. No.: 10/074,392

(22) Filed: Feb. 12, 2002

(65) Prior Publication Data

US 2003/0162528 A1    Aug. 28, 2003

(51) Int. Cl.$^7$ ................................................ H04Q 7/20
(52) U.S. Cl. .................. 455/411; 455/15; 455/54; 455/58; 340/825.49; 340/10.1; 340/10.42; 340/539.11; 702/213; 702/215
(58) Field of Search ................... 455/411, 15, 54, 455/58; 340/825.49, 10.1–42, 539.1, 539.11, 340/539.13, 539.16, 539.23, 933–938; 342/382, 342/457, 465, 357, 357.07; 701/213, 215

(56) References Cited

U.S. PATENT DOCUMENTS

| | | | |
|---|---|---|---|
| 3,699,443 A | 10/1972 | Weger | |
| 4,523,178 A | 6/1985 | Fulhorst | |
| 4,539,706 A * | 9/1985 | Mears et al. ................ 455/11.1 |
| 4,673,921 A * | 6/1987 | Saito et al. ............. 340/539.32 |
| 5,481,532 A | 1/1996 | Hassan et al. | |
| 5,602,535 A | 2/1997 | Boyles et al. | |
| 5,621,798 A | 4/1997 | Aucsmith | |
| 6,518,919 B1 * | 2/2003 | Durst et al. ............. 342/357.07 |
| 6,611,232 B1 * | 8/2003 | Wunderlich et al. ........ 342/387 |
| 6,664,888 B1 * | 12/2003 | Bishop .................. 340/426.11 |
| 6,745,253 B2 * | 6/2004 | Struble ......................... 710/10 |
| 2004/0183676 A1 * | 9/2004 | Eisenman .............. 340/539.13 |

* cited by examiner

Primary Examiner—Joseph Feild
Assistant Examiner—Julio Perez
(74) Attorney, Agent, or Firm—Tarolli, Sundheim, Covell & Tummino L.L.P.

(57) ABSTRACT

A vehicle communication path-tracing system (10) has a portable transmitter (12) and transceiver/controllers (14A–14N, 14T), located separately from the transmitter (12). A transmitter/controller (14T) is located at a target vehicle (16T) and at least one other transceiver/controller (e.g., 14A) is located at an intermediate location. An intermediate transceiver/controller receives a command signal intended for the target vehicle and transmits a retransmitted command signal intended for the target vehicle. The target transceiver/controller receives the retransmitted command signal and transmits an acknowledgement signal, intended for reception by the at least one intermediate transceiver/controller that transmitted the retransmitted command signal received at the target vehicle. The at least one intermediate transceiver/controller receives an acknowledgement signal and transmits a retransmitted acknowledgement signal.

15 Claims, 3 Drawing Sheets

VEHICLE COMMUNICATION PATH TRACING SYSTEM FOR LONG RANGE REMOTE COMMUNICATION WITH A VEHICLE

FIELD OF THE INVENTION

The present invention relates to remote convenience systems. The present invention is particularly directed to a system in which a remote convenience function is controlled across a relatively great distance.

BACKGROUND OF THE INVENTION

Remote convenience systems are known in the art. Such remote convenience systems permit remote control of various functions. One type of a remote convenience system is for remotely controlling vehicle functions. Other example types of remote convenience systems include garage door opener systems and entry light activation systems.

Focusing now on the remote convenience vehicle systems, examples of remotely controlled functions include locking and unlocking of one or more vehicle doors. A remote convenience vehicle system that permits remote locking and unlocking functions is commonly referred to as a remote keyless entry system.

Such remote convenience vehicle systems may provide for control of other vehicle functions. For example, a remote vehicle locator function may be provided. The vehicle locator function causes the vehicle horn to emit a horn chirp and/or the headlights of the vehicle to flash "ON". This allows a person to quickly locate their car within a crowded parking lot.

A known remote convenience vehicle system includes a receiver/controller mounted in an associated vehicle and at least one portable hand-held transmitter located remote from the receiver. The receiver/controller has a memory that stores one or more security codes, each of which is associated with a transmitter that is authorized to cooperate with the receiver/controller mounted in the vehicle. Also, the receiver/controller is operatively connected to one or more vehicle systems that perform the functions that are remotely requested.

Each transmitter is provided with one or more manually actuatable switches. Each switch is associated with a remote control vehicle function to be performed. The transmitter includes circuitry that responds to the actuation of each switch to transmit a message in the form of a signal. The transmitted signal also includes the appropriate security code. When the receiver/controller receives such a signal, it compares the security code portion of the received signal against its stored security code, and, if a match is found, a controller portion of the receiver/controller outputs a signal to the proper system (e.g., the door lock drivers) of the vehicle for causing performance of the requested function.

Portable transmitters of remote convenience systems transmit signals in the ultra-high frequency ("UHF") portion of the radio frequency ("RF") spectrum. Specifically, the frequency of the transmitted signals is in the portion of the RF spectrum that is allotted by the Federal Communications Commission ("FCC") for unlicensed transmission devices. FCC regulations stipulate that such unlicensed devices cannot have a transmitted signal strength that exceeds a stipulated maximum value.

It is often desirable to accomplish remote control performance of certain functions at a longest possible distance. One example of such a function is the remote vehicle locator function. To illustrate such a scenario, consider a shopping mall patron exiting a shopping mall building and being faced with the task of visually locating their car within a vast shopping mall parking lot. It would be beneficial to be able to actuate the remote vehicle locator function from a location near the exit door of the shopping mall, before proceeding into the parking lot.

In the case of long range remote vehicle location, however, it is possible that the vehicle might be beyond visual or audile range of the user. Background noise and visual obstructions may prevent the user from locating the vehicle. It would be desirable to provide a system where the vehicle can determine a path to the user and inform the user of the general direction of the vehicle.

SUMMARY OF THE INVENTION

In accordance with one aspect, the present invention provides a vehicle communication path-tracing system for long range communication with a vehicle. The system includes portable transmitter means for transmitting a command signal intended for and identifying a target vehicle. The system further includes a plurality of transceiver/controller means. Each of the transceiver/controller means is located separate from the portable transmitter means. One of the transmitter/controller means is located at the target vehicle, and at least one of the other transceiver/controller means is located at an intermediate location separate from the target vehicle. The at least one intermediately located transceiver/controller means includes means for receiving a command signal intended for the target vehicle and for transmitting a retransmitted command signal. The transceiver/controller means located at the target vehicle includes means for receiving the retransmitted command signal and for transmitting an acknowledgement signal in response to receipt of the retransmitted command signal. The acknowledgement signal is intended for reception by the at least one intermediately located transceiver/controller means that previously transmitted the retransmitted command signal received by the target vehicle transceiver/controller means. Each intermediately located transceiver/controller means includes means for receiving the acknowledgement signal and for transmitting a retransmitted acknowledgement signal.

In accordance with another aspect, the present invention provides a vehicle communication path-tracing system with user perceptible feedback. The system includes portable transmitter means for transmitting a command signal intended for and identifying the target vehicle. The system further includes a plurality of transceiver/controller means, each located separate from the portable transmitter means. One of the transceiver/controller means is located at the target vehicle, and at least one of the other transceiver/ controller means is located at an intermediate location separate from the target vehicle. The at least one intermediately located transceiver/controller means includes means for receiving a command signal intended for the target vehicle and for transmitting a retransmitted command signal intended for the target vehicle. The transceiver/controller means at the target vehicle includes means for receiving one of the retransmitted command signal, for providing user perceptible confirmation of receipt of the retransmitted command signal at the target vehicle, and for transmitting an acknowledgement signal. The acknowledgement signal is intended for reception by the at least one intermediately located transceiver/controller means that previously transmitted the retransmitted command signal received by the target vehicle transceiver/controller means. The at least one intermediately located transceiver/controller means includes means for receiving the acknowledgement signal and for providing user perceptible confirmation of reception of the acknowledgement signal.

BRIEF DESCRIPTION OF THE DRAWINGS

The foregoing and other features and advantages of the present invention will become apparent to those skilled in the art to which the present invention relates from a reading of the following detailed description of the preferred embodiment with reference to the accompanying drawings, in which.

DESCRIPTION OF THE EXAMPLE EMBODIMENT

Figure 1:
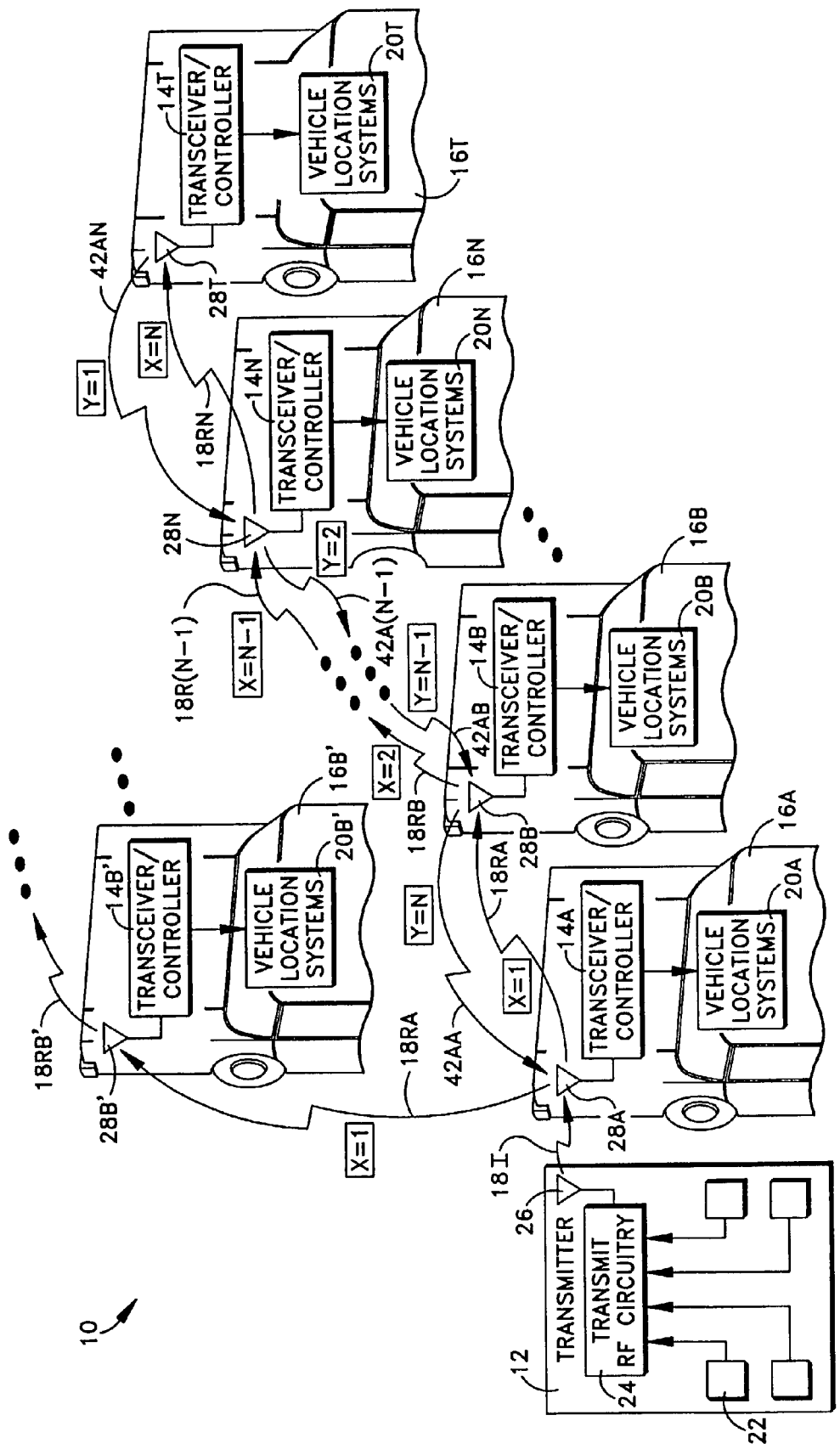
FIG. 1 is a schematic illustration of a remote convenience vehicle system, in accordance with the present invention.

An example of a vehicle communication path-tracing system, in accordance with the present invention, is the remote vehicle location system 10 shown schematically in FIG. 1. The system 10 includes a portable transmitter 12 (hereinafter referred to as the transmitter) and an associated transceiver/controller 14T mounted in an associated vehicle 16T. The transmitter 12 is in the possession of the authorized user (e.g., the owner/operator, not shown) of the associated vehicle 16T.

The transmitter 12 and the associated transceiver/controller 14T are referred to herein as being associated with each other because the transmitter can communicate, via a signal 18I, with the associated transceiver/controller 14T to achieve a particular vehicle function (e.g., remote activation of a vehicle location system 20T). Typically, the association relationship between the transmitter 12 and the associated transceiver/controller 14T is initially established at the time of manufacture of the associated vehicle 16T and/or upon installation of the transceiver/controller into the vehicle.

Further, the authorized user operates the transmitter 12 when the user intends for the signal 18I to cause performance of the requested remote convenience function at the associated vehicle 16T. As such, the transceiver/controller 14T, mounted in the associated vehicle 16T, is the target of the signal 18I. Hereinafter, the transceiver/controller 14T is referred to as the target transceiver/controller 14T. Also, hereinafter, the signal 18I is referred to as the initial signal 18I. The purpose of the designation of "initial" for the signal 18I will become apparent upon further reading.

Turning to the transmitter 12, the transmitter is typically sized to be hand-held. Typically, the transmitter 12 is of a size that allows its attachment to a key chain. Electronic components of the transmitter 12 are enclosed within a housing. The transmitter 12 includes at least one pushbutton switch 22, operatively connected to transmit radio frequency (RF) circuitry 24 within the transmitter. The transmit circuitry 24 is, in turn, operatively connected to a broadcast transmission antenna 26.

In response to pushbutton actuation, the transmit circuitry 24 generates/assembles a "packet" of information to be transmitted. In the example embodiment, the transmission packet includes a vehicle locator command and an identification code. The transmit circuitry 24 then provides an appropriate electrical signal that conveys the transmission packet to the antenna 26. In response to the stimulus of the electrical signal, the antenna 26 broadcasts the initial signal 18I, which is intended to be received by the target transceiver/controller 14T at the target vehicle 16T.

The transmitter 12 and its components (e.g. the transmit circuitry 24) are of any suitable structure and design to accomplish the transmission of the initial signal 18I. Further, the structure and design of the transmitter 12, and its components, may be of any known structure and design. Thus, the specifics are not discussed herein for the sake of brevity.

At the target vehicle 16T, a target antenna 28T is operatively connected to the transceiver/controller 14T associated with the vehicle. The target antenna 28T is tuned to "pick up" a signal (e.g., 18I) transmitted from the transmitter 12, or a signal (e.g., 18RN) from another transceiver/controller (e.g., 14N) as will be subsequently explained. In response to the received signal (18I or 18RA–18RN), the target antenna 28T outputs an electrical signal to the target transceiver/controller 14T that conveys the contents (e.g. vehicle location command, the identification code from the transmitter of the initial signal 18I).

Figure 2:
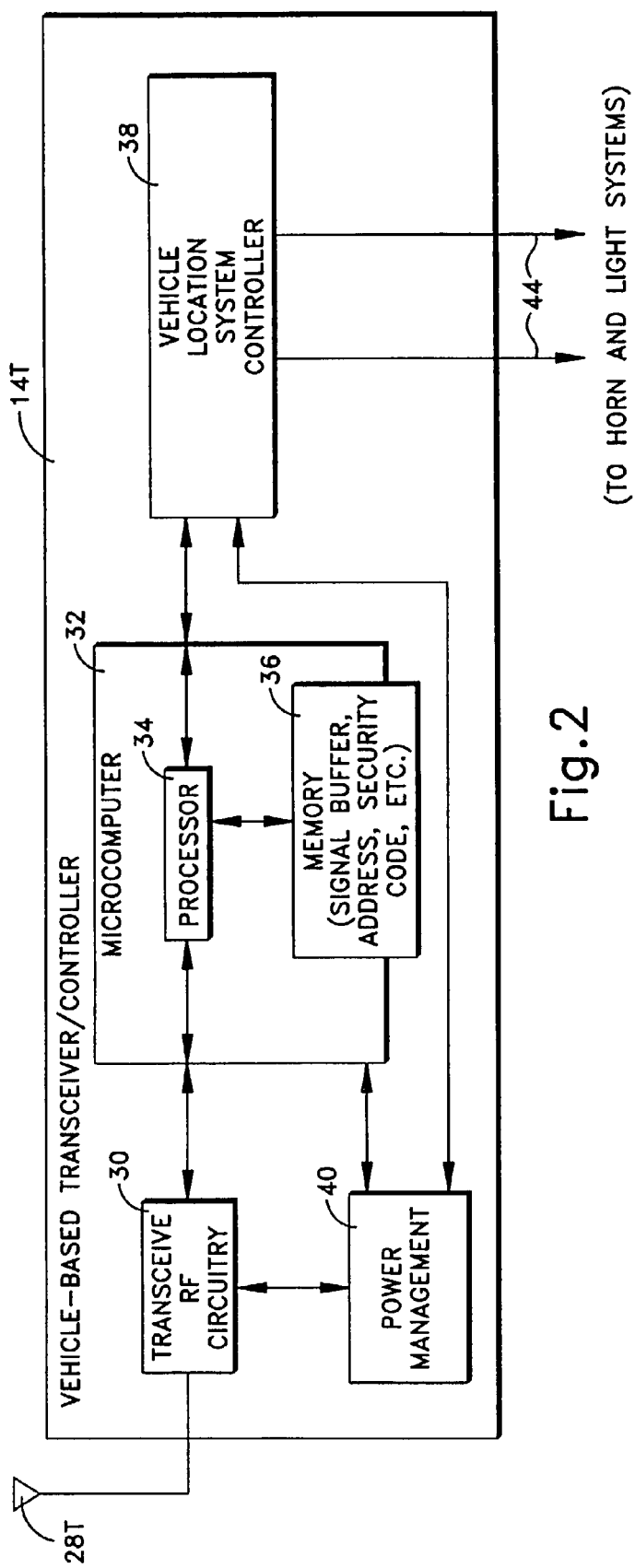
FIG. 2 is a schematic illustration of a transceiver/controller shown in FIG. 1.

Within the transceiver/controller 14T (FIG. 2) the electrical signal from the target antenna 28T is provided to transceive RF circuitry 30. In turn, the transceive circuitry 30 is operatively connected to a microcomputer 32 that has a processor 34 and a memory device 36.

The memory device 36 includes temporary storage capability, e.g., random access memory (RAM), and permanent memory, e.g., read only memory (ROM). One item stored within the permanent memory is the vehicle's identification code. The memory device 36 may be shared between the microcomputer 32 and other components (not shown) of the transceiver/controller 14T (as indicated by the overlap of the memory device out of the microcomputer 32).

Also within the transceiver/controller 14T is a vehicle location system controller 38. All of the components (e.g., 30, 34, and 38) of the transceiver/controller 14T are powered to operate via a power management circuit 40 that is, in turn, operatively connected to a power source (e.g., a vehicle battery, not shown).

During transceiver/controller 14T operation, when the antenna 28T picks-up the signal (18I or 18RA–18RN) and provides the electrical signal to the transceive circuitry 30, the transceive circuitry outputs the information (e.g. the vehicle location command message and the identification code from the transmitter 12) to the microcomputer 32. Within the microcomputer 32, the processor 34 compares the identification code from the transmitter 12 with the identification code from the permanent portion of the memory device 36 of the target transceiver/controller 14T. If the identification codes match, the processor 34 activates the vehicle location system and transmits an initial acknowledgement signal 42AN.

The processor 34 provides a signal that conveys the vehicle location command to the vehicle location system controller 38. In turn, the vehicle location system controller 38 provides appropriate signals 44 to the control systems for the horn and the headlights (not shown). The signals 44 may be conveyed directly to the systems (e.g., the vehicle location system controller may be connected directly to the control systems for the horn and the headlights) or the signals 44 may be conveyed to the systems via a vehicle communication bus.

When the vehicle location system is activated, the vehicle horn emits an audible signal (e.g., a short duration horn note known as a horn chirp) and/or the vehicle headlights "flash" ON (e.g., a short duration ON state) to alert the transmitter operator (e.g., the vehicle owner) as to the location of the vehicle. The person of ordinary skill will understand the components and circuitry for performing the vehicle location function, and the components and circuitry are omitted for the purpose of brevity. It will be appreciated that the present invention can be employed for systems that have other remote control vehicle functions (e.g., locking or unlocking of doors, panic alarm, trunk release). Also, it will be appreciated that other embodiments of the present invention may have other remotely controlled functions (e.g., garage door opening, or entry light activation).

Turning again to the target transceiver/controller 14T and the target antenna 28T, the target transceiver/controller 14T and target antenna 28T are also capable of transmitting broadcast signals in accordance with the present invention. Specifically, the antenna 28T is constructed such that the antenna 28T emits a broadcast signal in response to an electrical signal stimulus from the transceive circuitry 30. The microcomputer 32 controls the transceiver circuitry 30 to cause the transmission of a broadcast signal from the antenna 28T and also, at least partially, controls the content conveyed within the signal broadcast from the antenna 28T. The purpose of the ability to broadcast signals from the antenna 28T will become apparent upon further reading.

Focusing now on the situation in which the transmitter 12 (FIG. 1) is operated in an intended effort to cause activation of the vehicle location system at the target vehicle 16T, the initial signal 18I transmitted from the transmitter 12 may not reach the target vehicle 16T. The distance between the transmitter 12 and the target vehicle 16T may be too great for the initial signal 18I, given the strength of the initial signal and any outside interference that may be present. In order to alleviate the inconvenience of being unable to activate the vehicle location system because the target vehicle 16T is out-of-range for the initial signal 18I, the vehicle communication path-tracing system 10, in accordance with the present invention, includes at least one intermediate transceiver/controller (e.g., 14A) that is located in a vehicle (e.g., 16A) that is not the target vehicle 16T. The at least one transceiver/controller (e.g., 14A) is referred herein by the nomenclature of "intermediate." Each vehicle (e.g., 16A) within which a intermediate transceiver/controller (e.g., 14A) is located is also referred to by the nomenclature of "intermediate."

The number of intermediate vehicles (16A–16N) that are part of the system 10 in accordance with the present invention varies dependant upon the particular circumstances present when the transmitter 12 is operated. In the embodiment illustrated in the Figures, the variable number is "N." Each intermediate transceiver/controller (e.g., 14A) is not associated with the transmitter 12 in the same sense that the target transceiver/controller 14T is associated with the transmitter 12, but merely becomes part of the system 10 by cooperating to convey a vehicle location command from the transmitter 12 to the target vehicle 16T. In one example, an intermediate transceiver/controller (e.g., 14A) becomes part of the system 10 because the intermediate vehicle (e.g., 16A) happens to be present between the transmitter 12 and the target vehicle 16T (e.g., the target and intermediate vehicles are present in the same parking lot).

All of the intermediate transceiver/controllers 14A–14N are functionally identical to the target transceiver/controller 14T. Specifically, each transceiver/controller, both intermediate (e.g., 14A) and target 14T, is capable of receiving, altering, and re-transmitting signals. Moreover, each intermediate transceiver/controller 14A–14N is associated with its own transmitter (not shown) in the same sense that the target transceiver/controller 14T is associated with the transmitter 12 (e.g., each associated pairing of transmitter and transceiver/controller has its own unique identification code). Thus it is to be understood that each transceiver/controller can be the "target" (i.e., when its associated transmitter is actuated).

Turning now to the operation of the system 10 shown in FIG. 1 and in accordance with the present invention, each transceiver/controller (e.g., 14A) that is within range of the transmitter 12 receives the initial signal 18I, and determines if the initial signal 18I is intended for that vehicle (i.e. the transceiver/controller determines if it is the target transceiver/controller 14T) via review of at least a portion of the received signal information. In order for each receiving transceiver/controller (e.g., 14A) to determine if the received signal indicates that the receiving transceiver/controller is the target transceiver/controller, each transmitted signal (18I and 18RA–18RN) contains an identification code to identify the target. Preferably, the identification code is in the form of a unique address portion of the transmission packet conveyed via the initial signal 18I. In order to maintain security, the remainder of the signal information may be conveyed in encrypted form, with the address unencrypted. Encryption codes are permanently stored within the memory of the target transceiver/controller 14T, which allow the target transceiver/controller 14T to decrypt the message from its associated transmitter 12.

If the transceiver/controller is the target transceiver/controller 14T (FIG. 1), then the vehicle location system is activated, as described above. If the transceiver/controller is not the target transceiver/controller 14T (i.e., it is an intermediate transceiver/controller), the transceiver/controller (e.g., 14A) stores the identification code in memory and causes transmission of a new signal (e.g., 18RA) from its antenna (e.g., 28A) that is intended for the target vehicle 16T and that contains the same vehicle location command signal. Prior to retransmission, however, the signal is altered by the intermediate transceiver/controller (e.g., 14A) to indicate that it has been received and retransmitted by an intermediate transmitter. This may be accomplished in a number of ways, but in the present embodiment it is done by shifting bits to the left or right in the message stream each time an intermediate transceiver/controller (e.g., 14A) retransmits a signal. The result is that the retransmitted signal carries information about the number of intermediate transceiver/controllers through which it has been relayed in route to the target vehicle.

Further, each transceiver/controller (e.g., 14B) is capable of receiving a signal (e.g., 18RA) transmitted from an intermediate transceiver/controller (e.g., 14A) at an intermediate vehicle (e.g., 16B). In other words, each antenna (e.g., 28B) is tuned to pick-up the signals (e.g., 18RA) that relay the message, in addition to being used to pick-up the initial signal 18I. Each transceiver/controller (e.g., 14B) determines if the received signal (e.g., 18RA, from the intermediate transceiver/controller 14A) is intended for the associated vehicle (e.g., 16B).

If the vehicle is the intended recipient (i.e. the vehicle is the target vehicle 16T), the vehicle location system is activated and an acknowledgement signal is returned. If the vehicle (e.g., 16B) is not the intended recipient (i.e., the vehicle is not the target vehicle 16T), the transceiver/controller (e.g., 14B) stores the identification code in memory for later reference, alters the signal to indicate a further reception and retransmission and causes transmission of the altered signal (e.g., 18RB) containing the vehicle location command that is intended for the target vehicle.

As mentioned above, the vehicle communications path tracing system may include a variable number of intermediate transceiver/controllers (14A–14N). The number of intermediate transceiver/controllers (14A–14N) varies dependant upon the circumstances when the transmitter is actuated to emit the initial signal 18I. For example, in a crowded shopping mall parking lot, the target vehicle 16T may be at the far side of the parking lot, and the owner of the target vehicle 16T wants to locate the target vehicle 16T. Several dozen, or even several hundred, intermediate vehicles are present within the same parking lot as the target vehicle.

Upon actuation of the transmitter 12 and transmission of the initial signal 18I, the initial signal is received by the transceiver/controllers (e.g., 14A ) of one or more vehicles (e.g., 16A). For clarity in nomenclature, these first vehicles are referred to as first repeater vehicles. Each first repeater vehicle (e.g., 16A) is not the target vehicle 16T. Accordingly, the transceiver/controller (e.g., 14A) transmits a first repeat signal (e.g., 18RA).

The first repeat signals are received at one or more second vehicles (e.g., 16B and 16B'). The second vehicles (e.g., 16B and 16B') are referred herein as the second repeater vehicles. Because the second repeater vehicles (e.g., 16B and 16B') are not the target vehicle 16T, the transceiver/controller (e.g., 14B and 14B') of each second repeater vehicle transmits a second repeat signal (e.g., 18RB and 18RB'). This process continues (i.e. reception and repeating of signals at an $N^{th}$ vehicle), and eventually a repeat signal (e.g., 18RN) reaches the target vehicle 16T. The target vehicle 16T, in response to reception of the $N^{th}$ repeat signal (e.g., 18RN), activates the vehicle location function.

It is contemplated that given certain circumstances, the signal may be repeated in a direction away from the target vehicle, due in part to the broadcast nature of the signals. Also, at each level of "repeating", the signal may be simultaneously repeated by a plurality of repeater vehicles, and, at each level of repeating, a single vehicle may receive a plurality of repeat signals. Further, repeating may continue even after a signal is received at the target vehicle.

The transceiver/controllers include means to alleviate such unnecessary repeating. For example, the memory device 36 of each transceiver/controller contains a buffer that temporarily stores information (e.g., the identification code) about signals that are repeated. When a signal is received, the buffer is checked. If the signal had previously been repeated by the transceiver/controller, then the signal is not repeated. Other means can be employed to alleviate unnecessary repeating, such as appending a time limit or a repeat number limit to the transmission packet. Each repeating transmitter would compare the number of relays of the original signal to the limit before re-transmitting the signal. Also, the target transceiver/controller 14T could send a "cancel/ignore" signal upon completion of the requested function. A delay could be built into the relay of signals by intermediate transceiver/controllers (e.g., 14N) such that an immediate cancel/ignore signal would prevent repetition of the signal associated with the message within the range of the target transceiver/controller 14T.

Herein, for the purpose of brevity, the process of receiving a signal that is not intended for the associated vehicle and transmitting a signal which is intended for the target vehicle is referred to as relaying the initial signal 18I. It should be appreciated that the relayed signal will be different from the received signal, as it is altered by the intermediate transceiver/controller to indicate retransmission. The commands, codes, and address of the message, however, remain unchanged.

While the foregoing allows a signal to reach the target vehicle 16T even when it is out-of-range of the original transmission, the distance between the user and the target vehicle 16T may be so great as to prevent the user from perceiving the response. The aim of the present embodiment of the invention is to provide a response perceptible to the user at each intermediate vehicle along the path to the target vehicle that originally relayed the initial signal 18I. Since a large number of vehicles may have relayed the initial broadcast by the time the signal reaches the target vehicle 16T, it is necessary to distinguish the vehicles that lie in the general direction of the target vehicle.

To this end, once an appropriate signal is received at the target transceiver/controller 14T, the vehicle location function is activated, and an acknowledgement signal 42AN is broadcast. The acknowledgement signal 42AN contains the identification code for the target vehicle, an alteration noting that it has been broadcast once as an acknowledgement, and information about the number of times the signal was relayed through intermediate transceiver/controllers (e.g., 14A) in route to the target vehicle. Each intermediate vehicle (e.g., 16N) in range of the broadcast receives the acknowledgement signal 42AN at its antenna (e.g., 28N), which transfers the message to the intermediate transceiver/controller (e.g., 14N). The identification code is compared to a list of identification codes of signals relayed stored in memory.

If the received code does not match one of these codes, the signal is ignored. If the received code does match a code stored in memory, the vehicle removes the code from the list and its vehicle location system controller 38 activates its own vehicle locator system to produce a short horn chirp and flash of its lights, as described above. The vehicle then determines if it is necessary to alter and rebroadcast the signal, as described below. If retransmission is necessary, the intermediate transceiver/controller (e.g., 14N) alters the signal to indicate that the acknowledgement signal 42AN has been received at an intermediate transceiver/controller (e.g., 14N) and rebroadcast. Herein, the process of receiving, altering, and re-transmitting an acknowledgement signal will be referred to as relaying the acknowledgement.

The necessity of re-transmitting an acknowledgement signal 42AN is determined by comparing the number of times the initial signal 18I was relayed to the number of times the acknowledgement signal 42AN has been broadcast. Any method for comparing the number of relays of the initial signal 18I in route to the target vehicle 16T to the number of broadcasts of the acknowledgement signal 42AN may be used, but preferably, a signal is altered by shifting bits in the message stream in the opposite direction in which they were shifted when relayed to the target vehicle 16T.

In the example embodiment, it is necessary to retransmit the acknowledgement signal 42AN when the number of relays of the initial signal 18I in route to the target vehicle is greater than the number of relays of the acknowledgement signal 42AN. In the example embodiment, it is unnecessary to send the signal back to the original transmitter. The activation of a vehicle location system within range of the user is sufficient to provide the user with confirmation of the activation of the vehicle location system. Thus, the intermediate transceiver/controller (e.g. 14N) retransmits the acknowledgement signal when the number of relays of the initial signal 18I is greater than the number of broadcasts or transmissions of the acknowledgement signal 42AN. In terms of bit shifting, an intermediate transmitter (e.g., 14A) will not relay an acknowledgement signal when the acknowledgement signal received includes bits that are shifted back to their original position in the message stream. In other embodiments of the invention, it may be desirable to convey the acknowledgement signal to the transmitter 12. Such modifications in the system are within the scope of the present invention.

After transmission of the acknowledgement signal 42AN, the acknowledgement signal 42AN is received by the transceiver/controllers (e.g., 14N) of one or more vehicles. Again, for clarity of nomenclature, these vehicles will be referred to as $N^{th}$ repeater vehicles. Each $N^{th}$ repeater vehicle will determine if the identification code for the acknowledging system is stored in memory. If the identification code is not stored in memory, the acknowledgement message will be discarded. If the identification code is stored in memory, the $N^{th}$ repeater vehicle will react by activating its horn to produce a short chirp and causing its headlights to flash. Then, the transceiver/controller of the $N^{th}$ repeater vehicle will determine if the number of relays of the initial signal 18I is greater than the number of broadcasts or relays of the acknowledgement signal 42AN. Upon determining that the number of initial signal relays is greater than the number of acknowledgement signal relays, the transceiver/controller concludes that retransmission of the acknowledgement signal 42AN is necessary. The acknowledgement signal 42AN is altered to indicate a second broadcast of the acknowledgement, and then transmitted to the next set of vehicles upstream in the path traveled by the initial signal, i.e., in an opposite direction of the relay of the initial signal. The identification number for that message is then purged from memory.

The message is relayed back toward the user until it reaches the first repeating vehicle(s) (e.g., 16A) mentioned above. These vehicles will first determine that the identification code in the retransmitted acknowledgement signal 42AA matches a code stored in memory. Then, the transceiver/controller (e.g., 14A) will compare the number of broadcasts of the acknowledgement to the number of relays of the initial signal. Finding the numbers to be equal, the transceiver/controller will simply activate the horn chirp and flash of its headlights mentioned above and purge the identification code from its memory without re-transmitting the signal. As mentioned above, this system may be modified where it is desirable for the signal to reach the transmitter 12.

Figure 3:
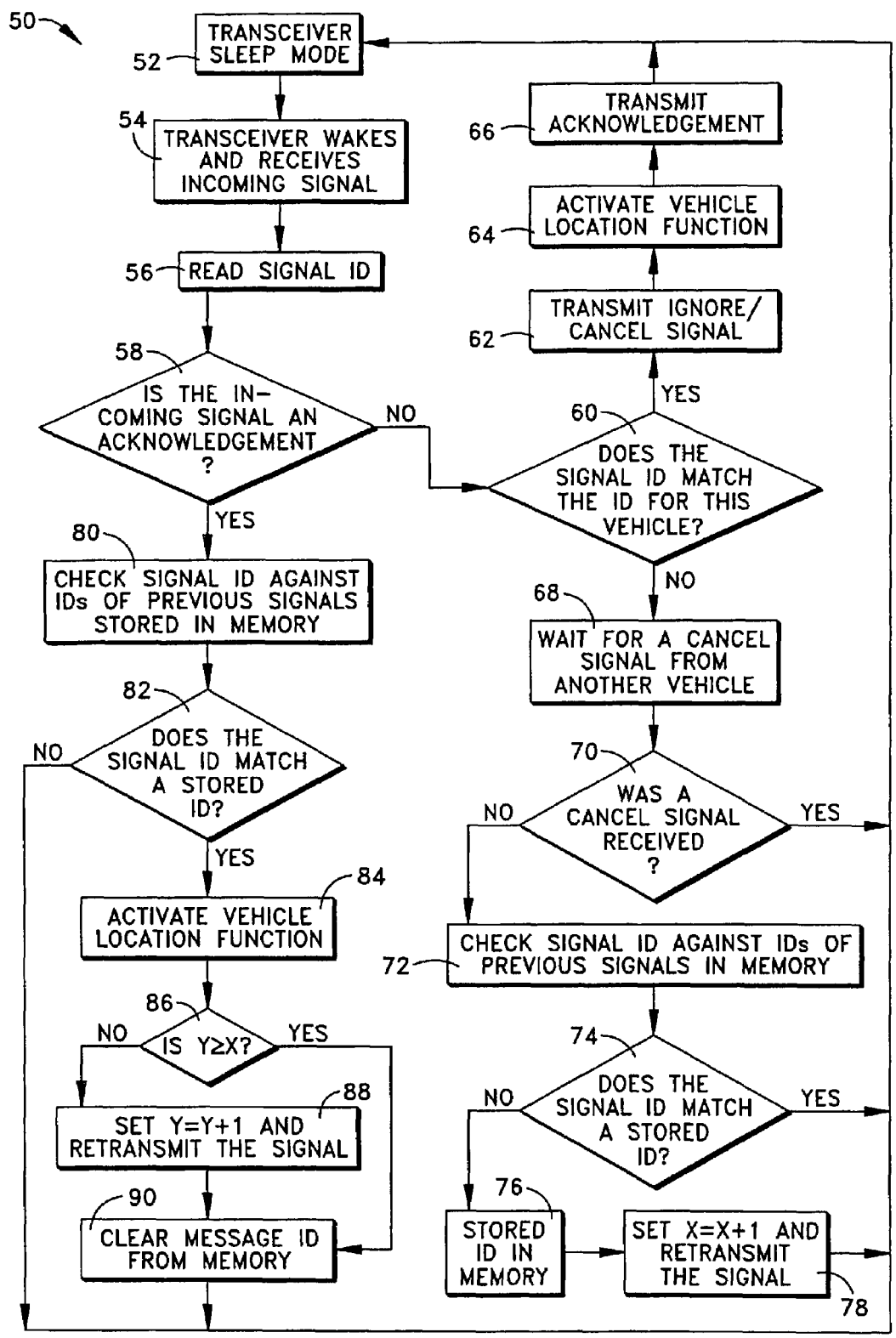
FIG. 3 is a flow chart for a process performed within a transceiver/controller shown in FIG. 1.

A process 50 in accordance with the present invention and performed within each of the transceiver/controllers in shown in FIG. 3. The process 50 begins at step 52 in which the transceiver/controller is in a sleep mode. It should be noted that in FIG. 3, transceiver/controller is abbreviated as "transceiver," the number of relays of the initial signal is represented as "X" and the number of broadcasts of the acknowledgement is represented as "Y". The process 50 proceeds from step 52 to step 54, in which the transceiver/controller wakes and receives an incoming signal. At step 56, the identification code conveyed within the received signal is read.

At step 58, the transceiver/controller determines if the signal is a command signal or an acknowledgement signal. If the signal is a command signal, the process proceeds to step 60, where the identification code from the signal is compared to the identification code for the vehicle. If the identification codes match, the process proceeds to step 62 where the vehicle immediately transmits an ignore/cancel signal (step 62), activates the vehicle location function (step 64), and transmits an acknowledgement signal (step 66). The transceiver/controller then returns to transceiver sleep mode (step 52).

Returning to step 60, if the identification codes do not match, the process goes to step 68, where the vehicle waits for a specified time for an ignore/cancel signal from another vehicle. If an ignore/cancel signal arrives within the specified time, the transceiver/controller returns to transceiver sleep mode (step 52). If no signal is received, the transceiver checks the identification code against those in memory (step 72). If the identification code matches a stored code, the message is redundant and is ignored. The transceiver/controller then returns to transceiver sleep mode (step 52).

If the identification code does not match an identification code in memory, the transceiver/controller stores the identification code in memory (step 76). It then alters the signal to indicate that it has been relayed another time and retransmits the altered signal (step 78). The transceiver/controller then returns to transceiver sleep mode (step 52).

Returning to step 58, if the signal is an acknowledgement, the process proceeds to step 80, where the identification code from the signal is compared to identification codes for previously received command signals that have been stored in memory (see step 76). If the identification code does not match an identification code stored in memory, the acknowledgement is not intended for this vehicle, and the transceiver/controller returns to transceiver sleep mode (step 52).

If the identification code matches an identification code stored in memory from a previously received command signal, the process proceeds to step 84, where the vehicle location function is activated to produce a horn chirp and a flash of the lights. The process then proceeds to step 86, where the number of transmissions of the acknowledgement signal (Y) is compared to the number of times the initial command signal had been relayed (X).

If Y is greater than or equal to X, it is unnecessary to retransmit the acknowledgement. The transceiver/controller clears the signal identification code from memory (step 90) and returns to transceiver sleep mode (step 52). If Y is less than X, the signal is altered to indicate a further broadcast (step 88) and the signal identification code is cleared from memory (step 90). The transceiver/controller then returns to transceiver sleep mode (step 52).

Although the presented embodiment of the invention relates to a vehicle location system, it should be apparent to one skilled in the art that the path tracing system described above is applicable to a number of remote vehicle convenience functions. For functions where user perceptible confirmation at the vehicle is undesirable, such as locking or unlocking the doors, the acknowledgement path could extend to a portable transceiver, allowing confirmation at the transceiver itself.

Additionally, from the above description of the invention, those skilled in the art will perceive improvements, changes and modifications beyond those mentioned above. Such improvements, changes and modifications within the skill of the art are intended to be covered by the appended claims.

What is claimed is:

1. A vehicle communication path-tracing system comprising:
    portable transmitter means for transmitting a command signal intended for and identifying a target vehicle; and
    a plurality of transceiver/controller means, each transceiver/controller means being located separate from said portable transmitter means, one of said transmitter/controller means being located at the target vehicle, at least one other of said transceiver/controller means being at an intermediate location separate from the target vehicle, the at least one intermediately located transceiver/controller means including means for receiving the command signal intended for the target vehicle and for transmitting a retransmitted command signal, said target vehicle transceiver/controller means including means for receiving the retransmitted command signal and for transmitting an acknowledgement signal in response to receipt of the retransmitted command signal, the acknowledgement signal being intended for reception by the at least one intermediately located transceiver/controller means that previously transmitted the retransmitted command signal which was received by the target vehicle transceiver/controller means, the at least one intermediately located transceiver/controller means including means for receiving the acknowledgement signal and for transmitting a retransmitted acknowledgement signal;

wherein the at least one intermediately located transceiver/controller means is located within a vehicle other than the target vehicle and is a target vehicle transceiver/controller means for another vehicle communication system.

2. A system as set forth in claim 1, wherein the at least one intermediately located transceiver/controller means includes means for altering the command signal so that the retransmitted command signal indicates that retransmission has occurred.

3. A system as set forth in claim 2, wherein said means for altering the command signal shifts bits within a message stream of the command signal.

4. A system as set forth in claim 1, wherein the acknowledgement signal actuates a perceivable signal that indicates the path of retransmission of the acknowledgement signal.

5. A system as set forth in claim 1, wherein the at least one intermediately located transceiver/controller means retransmits the retransmitted control signal only once, in response to receipt of the command signal.

6. A vehicle communication path-tracing system comprising:

portable transmitter means for transmitting a command signal intended for and identifying the target vehicle; and a plurality of transceiver/controller means, each transceiver/controller means being located separate from said portable transmitter means, one of said transmitter/controller means being located at the target vehicle, at least one other of said transceiver/controller means being at an intermediate location separate from the target vehicle, the at least one intermediately located transceiver/controller means including means for receiving a command signal intended for the target vehicle and for transmitting a retransmitted command signal intended for the target vehicle, said target vehicle transceiver/controller means including means for receiving the retransmitted command signal, for providing user perceptible confirmation of receipt of the retransmitted command signal at the target vehicle, and for transmitting an acknowledgement signal, the acknowledgement signal being intended for reception by the at least one intermediately located transceiver/controller means that previously transmitted the retransmitted command signal received by the target vehicle transceiver/controller means, and the at least one intermediately located transceiver/controller means including means for receiving the acknowledgement signal and for providing user perceptible confirmation of receipt of the acknowledgement signal;

wherein the at least one intermediately located transceiver/controller means is located within a vehicle other than the target vehicle and is a target vehicle transceiver/controller means for another vehicle communication system.

7. A system as set forth in claim 6, wherein the at least one intermediately located transceiver/controller means includes means for altering the command signal so that the retransmitted command signal indicates that a retransmission has occurred.

8. A system as set forth in claim 7, wherein said means for altering the command signal shifts bits within a message stream of the command signal.

9. A system as set forth in claim 6, where the at least one intermediately located transceiver/controller means includes means for transmitting a retransmitted acknowledgement signal.

10. A system as set forth in claim 6, wherein the at least one intermediately located transceiver/controller means actuates an auditory or visual indicator upon receiving an acknowledgement signal.

11. A system as set forth in claim 6, wherein the at least one intermediately located transceiver/controller means transmits the retransmitted command signal only once, in response to the receiving the command signal.

12. A method of remote vehicle communication, said method comprising:

transmitting a command signal, identifying a target vehicle and intended for reception at the target vehicle, through at least one intermediately located transceiver/controller located within a vehicle other than the target vehicle and is a target vehicle transceiver/controller for another vehicle communication system;

receiving the transmitted command signal at the at least one intermediately located transceiver/controller located separate from the target vehicle;

transmitting a retransmitted command signal from the at least one intermediately located transceiver/controller;

receiving the retransmitted command signal at the target vehicle;

transmitting an acknowledgement signal, containing an acknowledgement identifying the target vehicle and intended for reception at the at least one intermediate transmitter/controller that previously transmitted the retransmitted command signal;

receiving the acknowledgement signal at the at least one intermediately located transceiver/controller; and transmitting a retransmitted acknowledgement signal.

13. A method of remote vehicle communication, said method comprising:

transmitting a command signal, identifying a target vehicle and intended for reception at the target vehicle, through at least one intermediately located transceiver/controller located within a vehicle other than the target vehicle and is a target vehicle transceiver/controller for another vehicle communication system;

receiving the command signal at the at least one intermediately located transceiver/controller located separate from the target vehicle;

transmitting a retransmitted command signal from the at least one intermediately located transceiver/controller;

receiving the retransmitted command signal at the target vehicle;

transmitting an acknowledgement signal, containing an acknowledgement identifying the target vehicle and intended for reception at the at least one intermediate transmitter/controller that previously transmitted the retransmitted command signal;

receiving the acknowledgement signal at the at least one intermediately lately located transceiver/controller;

actuating user perceptible confirmation of receipt of the acknowledgement signal; and transmitting a retransmitted acknowledgement signal.

14. A vehicle communication path-tracing system comprising:

portable transmitter means for transmitting a command signal intended for and identifying a target vehicle; and a plurality of transceiver/controller means, each transceiver/controller means being located separate from said portable transmitter means, one of said transmitter/controller means being located at the target vehicle, at least one other of said transceiver/controller means being at an intermediate location separate from the target vehicle, the at least one intermediately located transceiver/controller means including means for receiving the command signal intended for the target vehicle and for transmitting a retransmitted command signal, said target vehicle transceiver/controller means including means for receiving the retransmitted command signal and for transmitting an acknowledgement signal in response to receipt of the retransmitted command signal, the acknowledgement signal being intended for reception by the at least one intermediately located transceiver/controller means that previously transmitted the retransmitted command signal which was received by the target vehicle transceiver/controller means, the at least one intermediately located transceiver/controller means including means for receiving the acknowledgement signal and for transmitting a retransmitted acknowledgement signal;

wherein the at least one intermediately located transceiver/controller means includes means for altering the command signal so that the retransmitted command signal indicates that retransmission has occurred.

15. A vehicle communication path-tracing system comprising:

portable transmitter means for transmitting a command signal intended for and identifying the target vehicle; and a plurality of transceiver/controller means, each transceiver/controller means being located separate from said portable transmitter means, one of said transmitter/controller means being located at the target vehicle, at least one other of said transceiver/controller means being at an intermediate location separate from the target vehicle, the at least one intermediately located transceiver/controller means including means for receiving a command signal intended for the target vehicle and for transmitting a retransmitted command signal intended for the target vehicle, said target vehicle transceiver/controller means including means for receiving the retransmitted command signal, for providing user perceptible confirmation of receipt of the retransmitted command signal at the target vehicle, and for transmitting an acknowledgement signal, the acknowledgement signal being intended for reception by the at least one intermediately located transceiver/controller means that previously transmitted the retransmitted command signal received by the target vehicle transceiver/controller means, and the at least one intermediately located transceiver/controller means including means for receiving the acknowledgement signal and for providing user perceptible confirmation of receipt of the acknowledgement signal;

wherein the at least one intermediately located transceiver/controller means includes means for altering the command signal so that the retransmitted command signal indicates that a retransmission has occurred.

* * * * *

UNITED STATES PATENT AND TRADEMARK OFFICE
CERTIFICATE OF CORRECTION

PATENT NO. : 6,968,176 B2  
DATED : November 22, 2005  
INVENTOR(S) : David Leonard Juzswik Page 1 of 1

It is certified that error appears in the above-identified patent and that said Letters Patent is hereby corrected as shown below:

Column 13,
Line 5, after "intermediately" delete "lately".

Signed and Sealed this

Twenty-first Day of March, 2006

JON W. DUDAS
*Director of the United States Patent and Trademark Office*